US008573684B2

United States Patent
Grimm et al.

(10) Patent No.: US 8,573,684 B2
(45) Date of Patent: Nov. 5, 2013

(54) SLIDING ROOF SUNSHADE ASSEMBLY

(75) Inventors: Rainer Grimm, Frankfurt (DE); Horst Boehm, Frankfurt am Main (DE)

(73) Assignee: Roof Systems Germany GmbH (DE)

( * ) Notice: Subject to any disclaimer, the term of this patent is extended or adjusted under 35 U.S.C. 154(b) by 28 days.

(21) Appl. No.: 12/955,967

(22) Filed: Nov. 30, 2010

(65) Prior Publication Data

US 2011/0127806 A1  Jun. 2, 2011

(30) Foreign Application Priority Data

Dec. 1, 2009 (EP) .................................... 09014901

(51) Int. Cl.
*B60J 7/00* (2006.01)
*B60J 7/043* (2006.01)
*B60J 7/057* (2006.01)

(52) U.S. Cl.
USPC .......................................... 296/214; 296/223

(58) Field of Classification Search
USPC ................................................ 296/214, 223
See application file for complete search history.

(56) References Cited

U.S. PATENT DOCUMENTS

| 4,561,691 | A | * | 12/1985 | Kawai et al. ............. 296/216.04 |
| 5,250,882 | A | * | 10/1993 | Odoi et al. ..................... 318/467 |
| 5,749,621 | A | * | 5/1998 | Smith ............................ 296/219 |
| 6,299,245 | B1 | * | 10/2001 | Thiele et al. .................. 296/214 |

FOREIGN PATENT DOCUMENTS

| DE | 4041341 | 6/1992 |
| DE | 202005020610 | 5/2006 |
| DE | 102005030973 | 1/2007 |

OTHER PUBLICATIONS

European Search Report Dated May 7, 2010.

* cited by examiner

*Primary Examiner* — Dennis Pedder
(74) *Attorney, Agent, or Firm* — Cantor Colburn LLP

(57) ABSTRACT

A sliding roof sunshade assembly for a vehicle has a sunshade element which can be moved in opening direction and a closing direction. The sunshade element has a bow at a free front end. At least one force-transmitting drive element is connected to the bow and to a drive in order to move the sunshade element into a closed setting, with the front end of the sunshade element assuming a predetermined closed position in the closed setting. At least one elastic intermediate element is arranged in a force flow between the drive and the front end of the sunshade element. Once the front end of the sunshade element has reached the closed position, the drive moves the drive element onward into a predetermined end setting in which the intermediate element is elastically deformed. The predetermined end setting corresponds to a position in which the elastic intermediate element is compressed by an amount within a predetermined tolerance path.

20 Claims, 2 Drawing Sheets

SLIDING ROOF SUNSHADE ASSEMBLY

RELATED APPLICATION

This application claims priority to European Application No. 09014901, which was filed Dec. 1, 2009.

FIELD OF THE INVENTION

The invention relates to a sliding roof sunshade assembly for a vehicle.

BACKGROUND

An opening which can be opened up by a sliding roof, or possibly also an opening which is closed off by a glass roof, in a vehicle roof is usually provided with a sunshade element which, in order to provide protection from solar radiation, can be moved by the vehicle occupants such that it fully or partially covers the opening or the glass roof on the inside. Such protection from the sun is also important because incident solar radiation can blind the driver. Here, even a small gap between a front end of the sunshade element and the edge of the roof opening, through which blinding solar radiation can still pass, can prove to be disturbing. It is therefore desirable for the front end of the sunshade element, in its closed position, to completely cover the front part of the roof opening to the interior space.

In recent years, use has increasingly been made of sunshade assemblies in which the sunshade element is moved by a motor as opposed to being moved manually. Here, tolerances which add up in the assembly can lead to an end setting of the front end of the sunshade element varying within a tolerance path. Such tolerances arise for example from the movement of the force-transmitting drive element which moves the sunshade element, and which is generally a cable guided to be resistant to tension and rigid in compression. Further tolerances arise, when using a roller blind as a sunshade element, during the winding and unwinding of the roller blind, or else from structural tolerances.

To compensate for these tolerances, a trim panel has hitherto been attached to the front end of the roof opening. This trim panel covers the front end of the sunshade element in its closed position in order to ensure that there is not an exposed gap. The disadvantage of this solution is that the clear width of the roof opening is reduced, which gives the vehicle occupants the impression that the roof opening is smaller.

Such a known solution is shown in FIG. 1, in which a front end of a sunshade element 1, in its closed position, moves beyond an upper end of a roof lining 2, and a gap formed between the roof lining 2 and a roof frame 3 is covered by a trim panel 4.

It is an object of the invention to provide a sliding roof sunshade assembly for a vehicle, in which substantially the entire clear width of the roof opening is opened up in the open state of the sunshade element.

SUMMARY

A sliding roof sunshade assembly for a vehicle has a sunshade element which can be moved in an opening direction and a closing direction. In a region of a free front end, the sunshade element has a bow. At least one force-transmitting drive element is provided which is connected to the bow and to a drive in order to move the sunshade element into a closed setting. The front end of the sunshade element assumes a predetermined closed position in the closed setting. At least one elastic intermediate element is provided which is arranged in a force flow between the drive and the front end of the sunshade element. Here, the drive is designed such that, once the front end of the sunshade element has reached the closed position, the drive moves the drive element onward into a predetermined end setting in which the intermediate element is elastically deformed.

In one example, an elastic coupling is provided between the front end of the sunshade element and the drive element. The elastic coupling makes it possible for the tolerances in the movement path of the sunshade element to be compensated by virtue of the drive element, after an end setting is reached, being moved onward into a position in which it is ensured, taking into consideration all the tolerances, that the sunshade element has reached its closed position. The end setting of the drive element is the position in which, without inaccuracies in the system, the sunshade element has exactly reached the closed position. The sunshade element pauses in its closed position when the sunshade element has reached the latter. The further movement of the drive element is absorbed exclusively by the elastic intermediate element. In this way, it is possible for a tolerance path in the region of approximately 10 mm to be compensated without problems.

Since it is ensured that the front end of the sunshade element ends exactly in the closed position during every closing process of the latter, the clear width of the roof opening need not artificially be reduced in size by a lining in order to eliminate the possibility of a gap remaining between the front end of the sunshade element and the edge of the roof opening.

It is preferable for the intermediate element to be tensioned to a lesser extent when the sunshade element is in an open setting than in the closed position, such that the entire compression path of the intermediate element, which self-evidently preferably corresponds to the maximum required tolerance path, can be utilized to compensate tolerances in the drive path.

The intermediate element is preferably designed as a compression spring, though may also be realized in the form of a tension spring.

The closed position may advantageously coincide with a position in which the front end of the sunshade element bears against a section of a roof lining of the vehicle. In this way, the roof opening is closed off in any case by the sunshade element and the roof lining. The roof lining may form a stop for the front end of the sunshade element.

Here, a force exerted by the drive on the drive element is preferably greater than the spring force of the intermediate element. If the front end of the sunshade element is restrained by a stop, for example as a result of the contact against a section of the roof lining, a further forward movement of the drive element can be converted into a compression of the intermediate element, without a further movement of the front end of the sunshade element taking place.

In one example, the drive element is a cable which is guided to be resistant to tension and rigid in compression. The drive element could self-evidently also be designed in some other form, for example integrated into a roller blind (for example a self-coiling spring steel strip at the edge of the roller blind).

As a sunshade element, use is made, for example, of a flexible roller blind or else a rigid sun panel. The principle of the invention can be implemented equally effectively in both cases.

In one embodiment, the bow is arranged to be movable relative to the drive element. If the sunshade element is situated in its closed setting and its front end is in the closed position, then a further movement of the drive element by the drive is converted only into a movement of the drive element, while the bow pauses in its position. In this case, the bow may be fixedly connected to the sunshade element.

The intermediate element may, for example, be arranged between a stop, which is fixed to the drive element, and the bow, wherein at a maximum, a movement by the defined magnitude of the tolerance path is permitted between drive element and bow. The stop is formed, for example, on a free end of the drive element. The relative movement is absorbed by compression of the intermediate element.

If the sunshade element is moved from its closed setting back into an open setting, the intermediate element is relaxed again and restores the bow for example automatically into its initial position.

The intermediate element may for example be a spiral spring which engages around the drive element.

Here, the bow is preferably fixedly fastened to the intermediate element such that the drive element can move relative to the bow counter to the resistance of the intermediate element. It is advantageous for only a linear movement in the movement direction but no movement perpendicular to said direction to be possible between the bow and the drive element, in order that exact positioning of the drive element, of the bow and of the front end of the sunshade element is possible.

In another embodiment, the at least one elastic intermediate element is arranged between the front end of the sunshade element and the bow. In this case, the front end of the sunshade element thus moves relative to the bow during a compression of the intermediate element. In this exemplary embodiment, the bow may be fixedly connected to the drive element, while the front end of the sunshade element should be arranged to be movable relative to the bow and relative to the body of the sunshade element by the magnitude of the tolerance path.

Here, for precise positioning, it is advantageous for the front end of the sunshade element, the intermediate element, and the bow to be arranged substantially linearly one behind the other. In this way, a force transmitted via the drive element can be introduced into the intermediate element without force components perpendicular to the movement direction.

Here, the sunshade element may have a substantially rigid closure element at the front end, which closure element extends preferably over the entire width of the sunshade element. The one or more elastic intermediate elements are advantageously arranged such that the closure element is acted on with force uniformly over the width. Here, it is possible for a plurality of spiral springs to be arranged adjacent to one another as intermediate elements.

It is preferable for at least one first guide part to be formed in the closure element and for at least one second guide part, which interacts with the first guide part, to be formed in the bow, with the guide parts being movable relative to one another. For example, recesses such as slots or bores may be provided in the bow, and webs may be provided in the closure element (or vice versa). Here, it is advantageous for the intermediate elements in the form of spiral springs to be held on a section of the webs, because in this way, the intermediate elements are equally fixedly held and are arranged so as to be deformable only in the linear direction.

The invention also relates to a method for moving a sunshade element of a sliding roof sunshade assembly for a vehicle, with the method being suitable in particular for one of the sliding roof sunshade assemblies described above.

Here, a free front end of the sunshade element bears, in a closed position, against a stop, and a drive element is moved by a drive into a predetermined end setting in order to move the sunshade element into the closed setting. The predetermined end setting corresponds to a position in which an elastic intermediate element, which is arranged in the force flow between the front end of the sunshade element and the drive element, is compressed by an amount within a predetermined tolerance path.

The drive element is accordingly moved further than would actually be required for reaching the closed position of the free front end of the sunshade element. The additional movement path is however converted not into a movement of the front end of the sunshade element, but rather into a compression of the elastic intermediate element.

Here, the predetermined end setting of the drive element may advantageously be predefined by the drive. The end setting may for example correspond to a previously defined number of revolutions of an electric motor. Here, the predetermined end setting should be selected such that, in any case, a compression of the intermediate element occurs.

If the sunshade element is moved back into its open setting again, the intermediate element is relaxed and the bow or the closure element of the sunshade element are moved back into their initial setting again preferably on account of the restoring force provided by the intermediate element.

These and other features of the present invention can be best understood from the following specification and drawings, the following of which is a brief description.

BRIEF DESCRIPTION OF THE DRAWINGS

Further features and advantages of the invention will emerge from the following description of two exemplary embodiments in conjunction with the appended drawings, in which.

DETAILED DESCRIPTION

Figure 2:
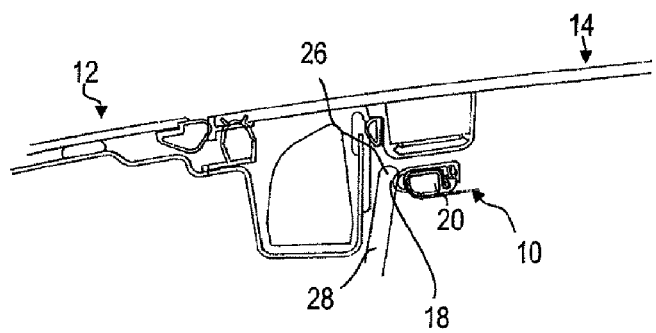
FIG. 2 shows a schematic sectional view of a sliding roof sunshade assembly according to the invention.

FIG. 2 illustrates a sliding roof sunshade assembly 10 installed in a vehicle roof 12 (not illustrated in any more detail). Formed in the vehicle roof 12 is a roof opening 14 which can be opened up or closed off by a sliding roof (not shown). Arranged below the roof opening 14 is a sunshade element 16 (indicated in FIG. 3) which can cover the roof opening 14. In the region of its front free end 18, the sunshade element 16 has a bow 20 which extends perpendicular to the vehicle longitudinal axis and along the entire sunshade element 16 and which is connected to a drive element 22 (see FIGS. 3, 4 and 6) which transmits the force of a drive 24, for example in the form of an electric motor, to the sunshade element 16. As a result of the movement of the drive 24, the sunshade element 16 can be moved from an open setting, in which the roof opening 14 is opened up, into a closed setting, as illustrated in FIG. 2.

In the closed setting shown in FIG. 2, the front end 18 of the sunshade element 16 bears, in its closed position, against a stop 26, which in this case is formed by a section of the upper end of a roof lining 28.

Figure 1:
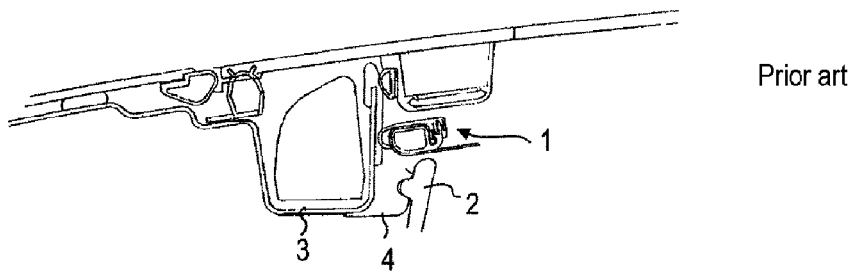
FIG. 1 shows a schematic sectional view of a sliding roof sunshade assembly according to the prior art.

Compared with the prior art which is shown in FIG. 1, it can be seen here that the roof lining 28 can be arranged significantly closer to the front end of the roof opening 14 (to the left in FIGS. 1 and 2). As a result, by means of the invention, the clear width of the roof opening 14 is increased in relation to the assembly known from the prior art.

As it moves into the closed setting, the sunshade element 16 approaches the roof lining 28 until, in the closed position, the front end 18 of the sunshade element 16 is in direct contact with a section of the roof lining 28. It would self-evidently also be possible at this juncture for a different stop to be provided on some component, which is fixed with respect to the vehicle, other than the roof lining 28.

The sunshade element 16 may be a roller blind which is held at its other end (not shown) in a folded or wound manner, though said sunshade element 16 may also be a rigid component which is displaced under the roof skin.

Figure 3:
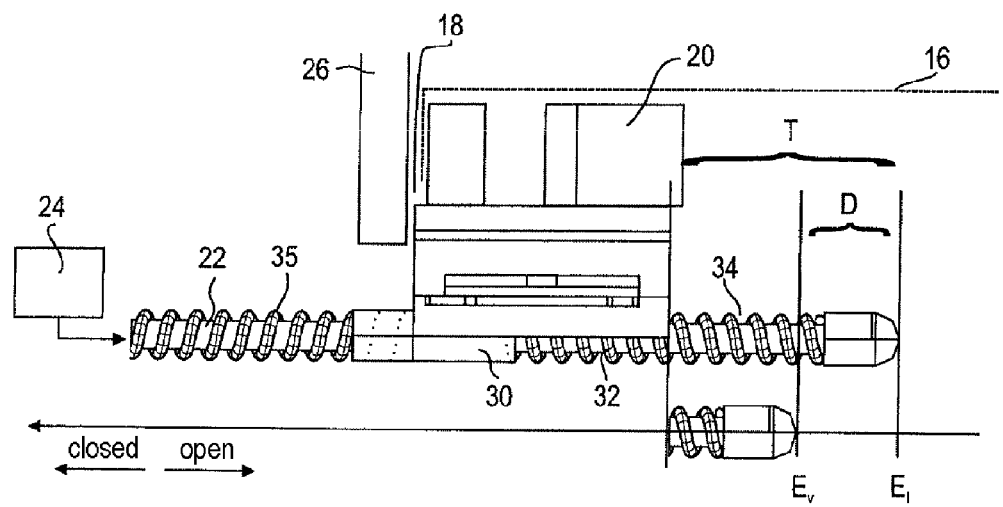
FIG. 3 shows a detail of a sliding roof sunshade assembly according to the invention according to a first embodiment.

In the first embodiment shown in FIG. 3, the bow 20 is connected, in the region of the front end 18 of the sunshade element 16 (which is merely indicated here), to the drive element 22 in such a way as to be mounted linearly movably with respect thereto. In this case, the drive element 22 is a cable which is guided to be resistant to tension and rigid in compression.

The bow 20 has a fastening section 30 which engages around the drive element 22 and which is fastened to an elastic intermediate element 32, which is designed as a spiral spring. The elastic intermediate element 32 in turn extends between the fastening section 30 on the bow 20 and a stop 34 which is fixed to the drive element, to which stop 34 said elastic intermediate element 32 is likewise fastened. The bow 20 can be moved along the drive element 22 counter to the spring force of the elastic intermediate element 32, in particular in the direction of the stop 34, that is to say to the right in FIG. 3.

Here, the bow 20 and the sunshade element 16 are rigidly connected to one another.

The drive element 22 preferably runs in a guide rail (not shown). Normally, in each case one drive element 22 is provided in a guide rail at each side of the sunshade element 16. This design may also be used here.

During a movement of the sunshade element 16 in the closing direction toward the closed setting (to the left in FIG. 3), the drive 24 exerts tension on the drive element 22 and, via the latter, on the bow 20 and the sunshade element 16.

The spring force of the elastic intermediate element 32 is selected to be greater than the force required for moving the sunshade element 16 out of its open setting into the closed setting. During said movement, the sunshade element 16 is thus moved as if the bow 20 were rigidly connected to the drive element 22.

During the course of the closing movement, the front end 18 of the sunshade element 16 comes into contact with the stop 26, which is formed here by a section of the roof lining 28. The front end 18 has thereby reached its closed position, and the drive element 22 has reached its ideal end setting $E_i$. However, the drive 24 is set up such that the movement of the drive element 22 in the closing direction is continued beyond said ideal end setting $E_i$. The drive moves the drive element 22 onward in the closing direction until it has reached a predetermined end setting $E_v$.

The two end settings $E_i$, $E_v$ are schematically illustrated in FIG. 3 at the rear free end of the drive element 22.

The presetting of the predetermined end setting $E_v$ is carried out, for example, by predefining the number of revolutions of an electric motor which forms the drive 24. Depending on the tolerances of the positions of the sunshade element 16 and of the drive element 22 or else on the accuracy of the winding of the wound-up part of a roller blind, the predefined end setting $E_v$ varies within a tolerance range T, which amounts to approximately 10 mm.

The intermediate element 32 is designed such that, as a result of its compression, it can fully compensate this tolerance range T. In physical terms, it is self-evidently always only the present difference D between the preset end setting $E_v$ and the ideal end setting $E_i$ that is compensated.

The compression of the elastic intermediate element 32 takes place by virtue of the sunshade element 16 being restrained, at its front end 18, on the stop 26, as a result of which the bow 20 is also fixedly held in said position. Since the bow 20 is movable relative to the drive element 22, the drive element 22 moves relative to the bow 20 to the left (in FIG. 3). Here, the elastic intermediate element 32 is compressed. Said movement takes place until the drive element 22 has assumed the predetermined end setting $E_v$.

Since the ideal end setting $E_i$ is always overshot, it is always ensured that the front end 18 of the sunshade element 16 actually comes into contact with the stop 26 and the roof opening 14 is thereby closed off without any gaps.

If the sunshade element 16 is moved into its open setting again in order to open up the roof opening 14, the drive 24 moves the drive element 22 in the opposite direction (to the right in FIG. 3). The elastic intermediate element 32 firstly relaxes such that the bow 20 is restored into its initial position, and the entire group composed of drive element 22, intermediate element 32, bow 20 and sunshade element 16 is subsequently moved onward together, without relative movement, in the opening direction.

Optionally, a second elastic intermediate element 35 may be provided which is arranged between the bow 20 and a front stop which is fastened to the drive element 22. In the example illustrated, the intermediate element 35 (likewise a spiral spring here) is compressed at the end of the opening movement when the bow 20 has abutted against a stop. Tolerance compensation is thus obtained during the opening movement, too, by means of a further movement of the drive element 22.

FIGS. 4 to 7 show a second embodiment in which an elastic intermediate element 132 is arranged between the front end 18 of the sunshade element 16 and a bow 120.

The sunshade element 16 has, at its front end 18, a closure element 140 which is designed as a rigid component which extends over the entire width of the sunshade element 16. The closure element 140 and the bow 120 are designed so as to be movable relative to one another. In this case, the drive element 22 is fixedly connected to the bow 120, such that the latter is movable neither relative to the body of the sunshade element 16 nor relative to the drive element 22.

Figure 5:
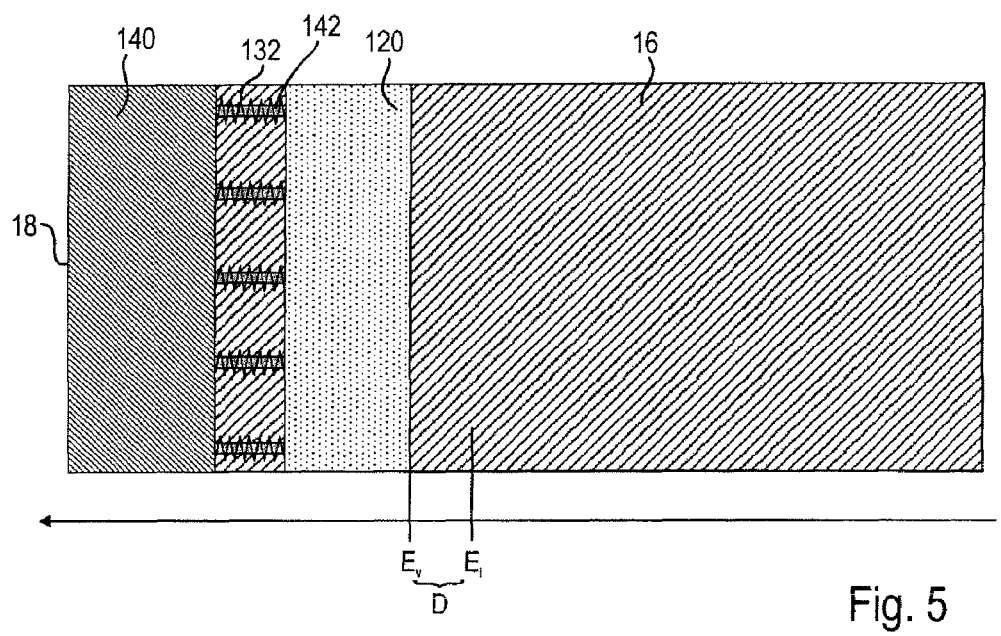
FIG. 5 shows the assembly from FIG. 4 in a plan view.

A plurality of elastic intermediate elements 132 are provided, in this case five, which are arranged adjacent to one another so as to be distributed uniformly over the width of the sunshade element 16, as shown in FIG. 5. The intermediate elements 132 are all arranged between the closure element 140 and the bow 120.

The closure element 140 and the bow 120 are connected to one another by first and second guide parts 142, 144 in such a way as to be linearly movable relative to one another in a guided fashion. Here, the first guide parts 142 are formed by webs, one for each elastic intermediate element 132, which webs are formed in one piece with the closure element 140 and project from the latter in the movement direction. Arranged around each of the webs is one of the intermediate elements 132, which in this case are designed as spiral springs.

In each case corresponding recesses are formed, as second guide parts 144, in the bow 120, into which recesses the webs project. In this way, the bow 120 and the closure element 140 are movable relative to one another, but are connected to one another so as to be guided in terms of their movement.

Formed at the front end of each of the recesses in the bow 120 is a stop 146 against which an end of the elastic intermediate element 132 bears.

During a relative movement of the closure element 140 and bow 120 toward one another, the elastic intermediate element 132 is compressed. When the exerted force is decreased, the intermediate element 132 relaxes and pushes the bow 120 and closure element 140 apart again until they reach the original initial position in which the intermediate element 132 is relaxed.

It would self-evidently also be possible to provide more or fewer elastic intermediate elements 132 or for the webs and recesses to be formed in a reversed arrangement.

Figure 4:
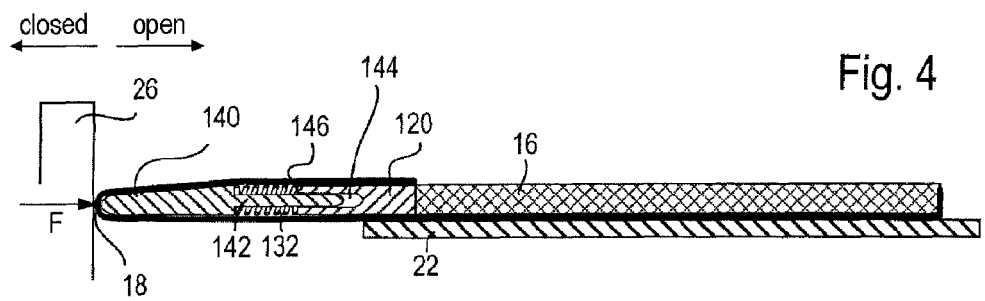
FIG. 4 shows a schematic sectional view of a detail of a sliding roof sunshade assembly according to the invention according to a second embodiment.
Figure 6:
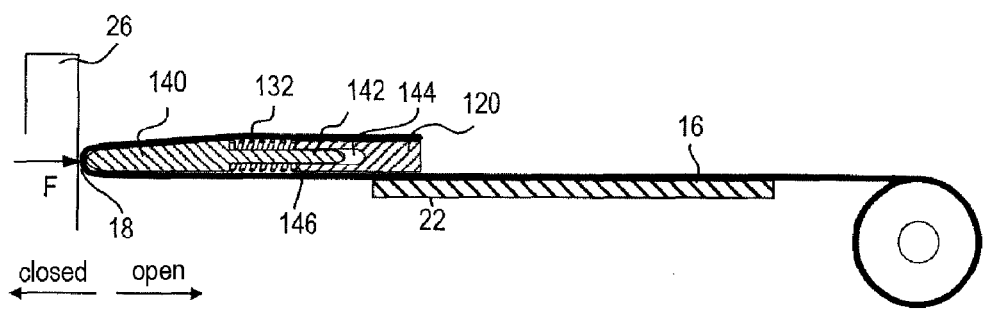
FIG. 6 shows a variant of the assembly shown in FIG. 4, in a schematic sectional view.

For closing, the sunshade element 16 is moved to the left in FIGS. 4 and 6 by the drive 24 (not shown here) until the front end 18 comes into contact with the stop 26. The sunshade element 16 has thereby reached its closed position. However, the drive 24 moves the drive element 22 onward in the closing direction. In this way, the bow 120 which is fixedly connected to the drive element 22 is also moved further to the left in the closing direction. The force exerted by the drive 24 is now absorbed by the intermediate elements 132, which are compressed such that a relative movement between the bow 120 and closure element 140 takes place, with the closure element 140 not being moved. The movement ends when the drive element 22 has reached its predetermined end setting $E_v$ (see FIG. 5).

During the movement in the opposite direction for opening the sunshade element 16, the drive 24 moves the drive element 22 in the opposite direction, to the right in FIGS. 4 to 6. Here, firstly the elastic intermediate elements 132 are relaxed, such that the bow 120 and closure element 140 assume their initial position relative to one another again, and the sunshade element 16 is subsequently moved into its open setting.

Here, FIG. 4 shows the invention for a rigid sunshade element 16, for example in the form of a sunroof, while FIG. 6 shows the implementation for a flexible roller blind, which at its second end is arranged in a roller blind winding.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof sunshade assembly for a vehicle comprising:
    a sunshade element movable in an opening direction and a closing direction, and which includes a bow in a region of a free front end of the sunshade element;
    at least one force-transmitting drive element connected to the bow and to a drive in order to move the sunshade element into a closed setting, with the free front end of the sunshade element assuming a predetermined closed position wherein the free front end contacts a stop in the closed setting;
    at least one elastic intermediate element arranged in a force flow between the drive and the free front end of the sunshade element; and wherein once the free front end of the sunshade element has reached the closed position and the free front end has contacted the stop, said drive moves the force-transmitting drive element onward in the closing direction to a predetermined end setting in which the at least one elastic intermediate element is elastically deformed after the free front end has contacted the stop.

2. The sliding roof sunshade assembly as claimed in claim 1, wherein the at least one elastic intermediate element is tensioned to a lesser extent when the sunshade element is in an open setting than in the closed position.

3. The sliding roof sunshade assembly as claimed in claim 1, wherein the stop comprises a section of a roof lining of the vehicle.

4. The sliding roof sunshade assembly as claimed in claim 1, wherein a force exerted by the drive on the force-transmitting drive element is greater than a spring force of the at least one elastic intermediate element.

5. The sliding roof sunshade assembly as claimed in claim 1, wherein the force-transmitting drive element is a cable which is guided to be resistant to tension and rigid in compression.

6. The sliding roof sunshade assembly as claimed in claim 1, wherein the sunshade element is a flexible roller blind or a rigid sun panel.

7. The sliding roof sunshade assembly as claimed in claim 1, wherein the bow is arranged to be movable relative to the force-transmitting drive element.

8. The sliding roof sunshade assembly as claimed in claim 7, wherein the at least one elastic intermediate element is arranged between a stop, which is fixed to the force-transmitting drive element, and the bow.

9. The sliding roof sunshade assembly as claimed in claim 1, wherein the at least one elastic intermediate element is arranged between the free front end of the sunshade element and the bow.

10. The sliding roof sunshade assembly as claimed in claim 9, wherein the free front end of the sunshade element, the at least one elastic intermediate element, and the bow are arranged substantially linearly one behind the other.

11. The sliding roof sunshade assembly as claimed in claim 1, wherein the sunshade element has a substantially rigid closure element at the free front end, and the substantially rigid closure element extends over an entire width of the sunshade element, with one or more elastic intermediate elements being arranged such that the rigid closure element is acted on with force uniformly over the width.

12. The sliding roof sunshade assembly as claimed in claim 11, wherein at least one first guide part is formed in the closure element and at least one second guide part, which interacts with the first guide part, is formed in the bow, with the first and second guide parts being movable relative to one another.

13. A method for moving a sunshade element of a sliding roof sunshade assembly for a vehicle comprising the steps of:
    bearing a free front end of the sunshade element into a closed position, wherein the free front end contacts a stop via a drive coupled to the sunshade via a drive element, wherein the drive element is moved in a closing direction; and
    further moving the drive element in the closing direction after the free front end contacts the stop via the drive wherein the drive element is moved into a predetermined end setting with respect to a bow coupled to the sunshade element, and wherein the predetermined end setting corresponds to a position in which an elastic intermediate element that is arranged in a force flow between the free front end of the sunshade element and the drive element is compressed by an amount within a predetermined tolerance path corresponding to the predetermined end setting.

14. The method as in claim 13, wherein the elastic intermediate element is tensioned to a lesser extent when the sunshade element is in an open setting than in the closed position.

15. The method as in claim 13, wherein the stop comprises a section of a roof lining of the vehicle.

16. The method as in claim 13, wherein a force exerted by the drive on the drive element is greater than a spring force of the elastic intermediate element.

17. The method as in claim 13, wherein the drive element is a cable which is guided to be resistant to tension and rigid in compression.

18. The method as in claim 13, wherein the sunshade element is a flexible roller blind or a rigid sun panel.

19. The method as in claim 13, wherein the sunshade element has a substantially rigid closure element at the free front end, and the substantially rigid closure element extends over an entire width of the sunshade element, and the elastic intermediate element is a plurality of elastic intermediate element arranged between the bow and the rigid closure element.

20. The method as in claim 19, wherein the substantially rigid closure element is movable with respect to the bow.

* * * * *